Figure 1:
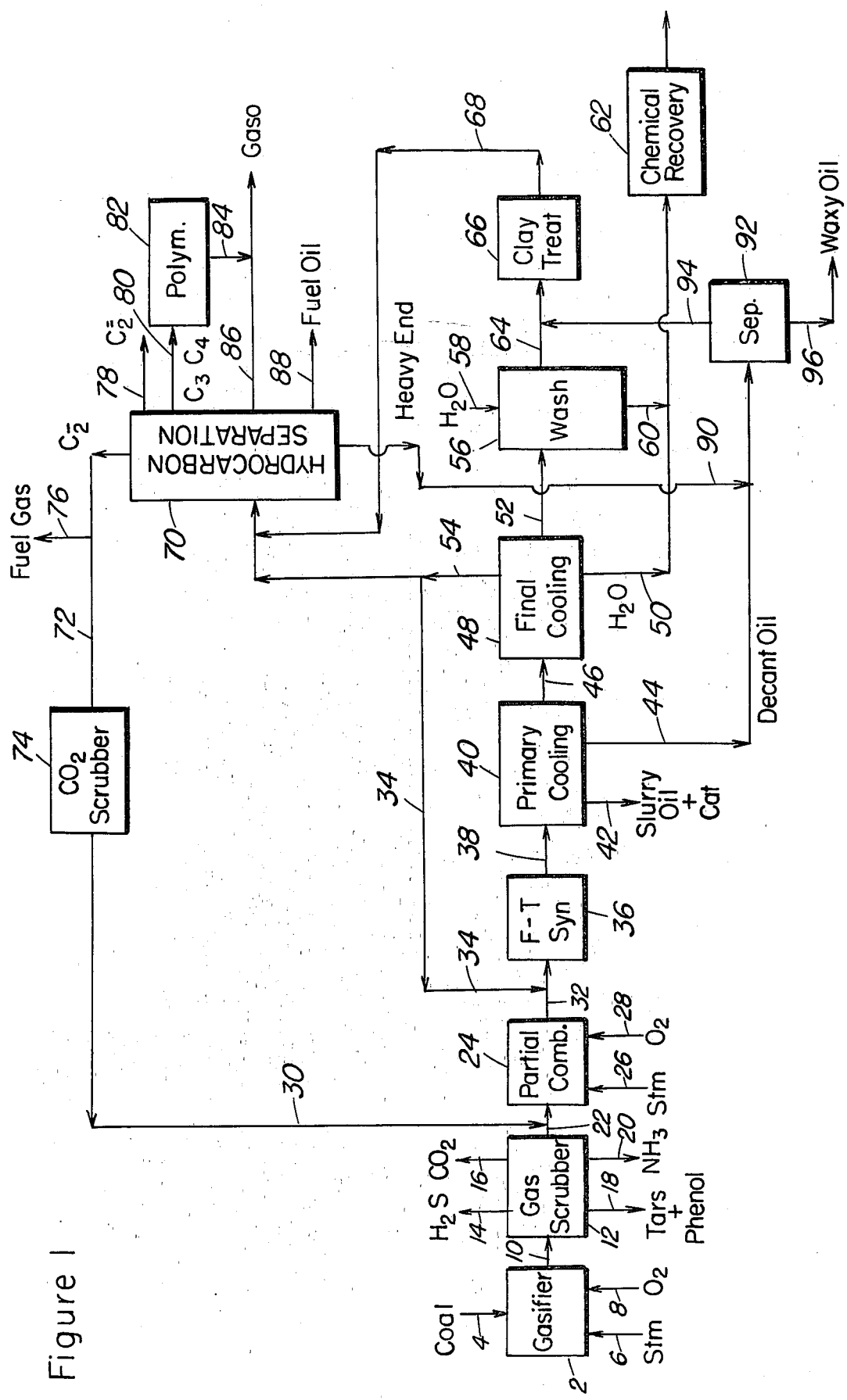

United States Patent [19]

Ireland et al.

[11] 4,053,532
[45] Oct. 11, 1977

[54] METHOD FOR IMPROVING THE FISCHER-TROPSCH SYNTHESIS PRODUCT DISTRIBUTION

[75] Inventors: Henry R. Ireland, Woodbury; Thomas R. Stein, Cherry Hill, both of N.J.

[73] Assignee: Mobil Oil Corporation, New York, N.Y.

[21] Appl. No.: 638,217

[22] Filed: Dec. 5, 1975

Related U.S. Application Data

[63] Continuation-in-part of Ser. No. 601,753, Aug. 4, 1975.

[51] Int. Cl.² .............................................. C07C 1/04
[52] U.S. Cl. ................................ 260/676 R; 208/111; 260/450
[58] Field of Search ................... 208/111; 260/676 R, 260/450

[56] References Cited

U.S. PATENT DOCUMENTS

| 3,546,100 | 12/1970 | Yan | 208/111 |
| 3,700,585 | 10/1972 | Chen et al. | 208/111 |
| 3,706,658 | 12/1972 | Hass et al. | 208/111 |
| 3,755,145 | 8/1973 | Orkin | 208/111 |

Primary Examiner—Herbert Levine
Attorney, Agent, or Firm—Charles A. Huggett; Carl D. Farnsworth

[57] ABSTRACT

The product of Fischer-Tropsch Synthesis is separated to recover a product boiling above about 400° F which is thereafter processed over a selective crystalline zeolite under hydrodewaxing conditions promoting the formation of fuel oil and gasoline products. Improving start up and operation of the process in the presence of a ZSM5 crystalline zeolite is described.

5 Claims, 2 Drawing Figures

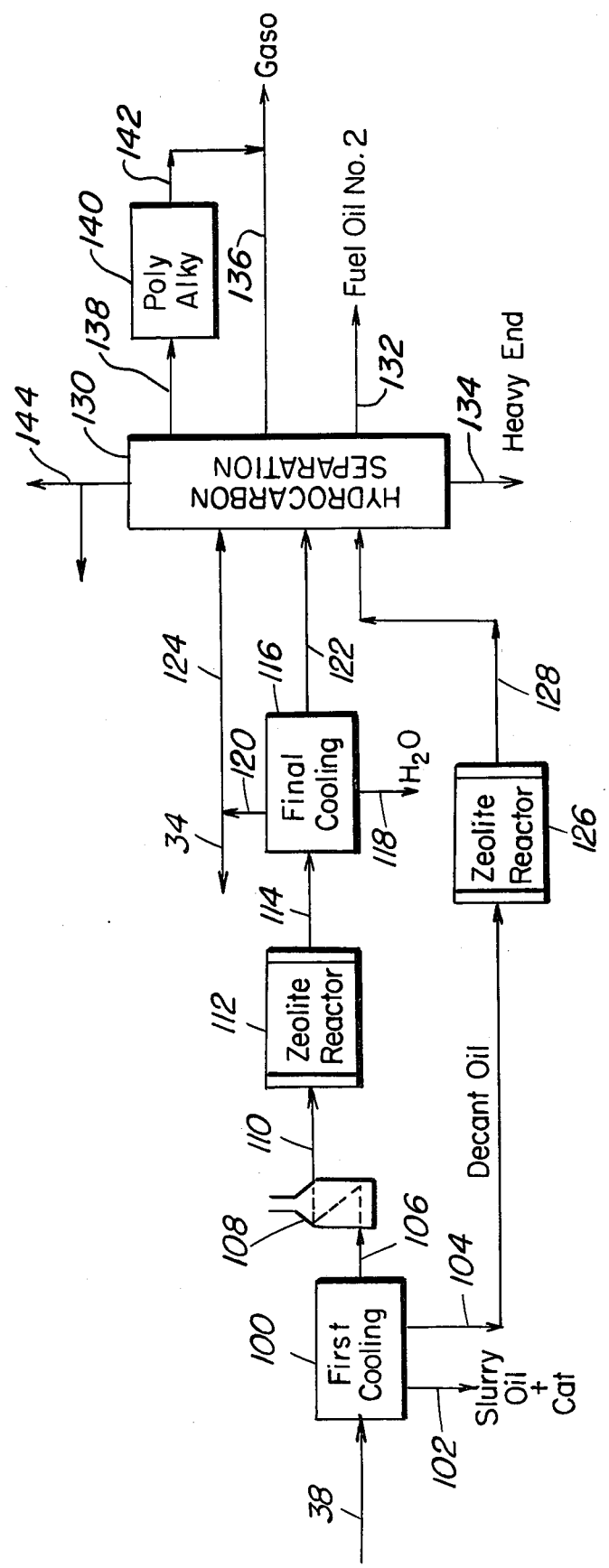
Figure II

METHOD FOR IMPROVING THE FISCHER-TROPSCH SYNTHESIS PRODUCT DISTRIBUTION

This application is a continuation-in-part of copending application, Ser. No. 601,753, filed Aug. 4, 1975.

BACKGROUND OF THE INVENTION

PRIOR ART

Processes for the conversion of coal and other hydrocarbons such as natural gas to a gaseous mixture consisting essentially of hydrogen and carbon monoxide, or of hydrogen and carbon dioxide, or of hydrogen and carbon monoxide and carbon dioxide, are well known. Although various processes may be employed for the gasification, those of major importance depend either on the partial combustion of the fuel with an oxygen-containing gas or on a combination of these two reactions. An excellent summary of the art of gas manufacture, including synthesis gas, from solid and liquid fuels, is given in Encyclopedia of Chemical Technology, Edited by Kirk-Othmer, Second Edition, Volume 10, pages 353–433, (1966), Interscience Publishers, New York, N.Y., the contents of which are herein incorporated by reference. Volume 4, pp. 446–488, Interscience Publishers, New York, N.Y., the text of which is incorporated herein by reference.

It is desirable to effectively and efficiently convert synthesis gas, obtained from coal, natural gas or any other available source to highly valued hydrocarbons such as motor gasoline with relatively high octane number, petrochemical feedstocks, liquefiable petroleum fuel gas, and aromatic hydrocarbons. It is well known that synthesis gas will undergo conversion to form reduction products of carbon monoxides, such as oxygenates and hydrocarbons, at temperatures in the range of about 300° F to about 850° F under pressures of from about one to one thousand atmospheres pressure, over a fairly wide selection of catalyst compositions. The Fischer-Tropsch process, for example which has been most extensively studied, produces a range of products including oxygenates, heavy waxy oils, and liquid hydrocarbons which have been used as low octane gasoline. The types of catalysts that have been studied for this and related processes include those based on metals or oxides of iron, cobalt, nickel, ruthenium, thorium, rhodium and osmium.

The wide range of catalysts and catalyst modifications disclosed in the art and an equally wide range of conversion conditions used in the reduction of carbon monoxide by hydrogen contribute some flexibility toward obtaining a variety of different boiling-range products. Nonetheless, in spite of this flexibility, it has not proved possible to produce substantial quantities of liquid hydrocarbons in the gasoline boiling range which contain highly branched paraffins and substantial quantites of aromatic hydrocarbons, both of which are required for high quality gasoline, or to selectively produce aromatic hydrocarbons particularly rich in the benzene to xylenes range. A review of the status of this art is given in "Carbon Monoxide-Hydrogen Reactions", Encyclopedia of Chemical Technology, Edited by Kirk-Othmer, Second Edition.

SUMMARY OF THE INVENTION

This invention is concerned with improving the product distribution and yield of products obtained by a Fischer-Tropsch synthesis gas conversion process. In a particular aspect, the present invention is concerned with improving the fuel oil product yield, of a synthesis gas conversion operation.

A Fischer-Tropsch Synthesis gas conversion process is relied upon to convert syngas obtained from coal to form particularly hydrocarbons, oxygenates and chemical forming components. The process complex is enomorous, expensive to operate and may be conveniently divided or separated into (1) a synthesis gas preparation complex from coal, (2) a Fischer-Tropsch type of synthesis gas conversion in both or either a fixed catalyst bed operation and a fluid catalyst bed operation, (3) a product recovery operation and (4) an auxiliary plant and utility operations required in such a complex.

The extremely diverse nature of the products obtained in such a combination operation amplifies the complexity of the overall process arrangement and its operating economics. The synthesis operation is known to produce a wide spectrum of products including fuel gas, light olefins, LPG, gasoline, light and heavy fuel oils, waxy oils and oxygenates identified as alcohols, acetones, ketones, and acids, particularly acetic and proprionic acid. The $C_2$ and lower boiling components may be reformed to carbon monoxide and hydrogen or the $C_2$ formed hydrocarbons and methane may be combined and blended for use in a fuel gas pipeline system.

In the operation, the water soluble oxygenates or chemicals are separated and recovered as individual components with the formed organic acids remaining in the water phase separately processed. Disposal of the oxygenates and formed acids is a very expensive operation. Propylene and butylene formed in the process are converted to gasoline boiling components as by polymerization in the presence of a solid phosphoric acid catalyst. Propane and butane on the other hand are used for LPG.

The present invention is concerned with improving the hydrodewaxing of heavy oil products and particularly the waxy oil product of a Fischer-Tropsch synthesis gas conversion operation as well as the fuel oil product yield thereof.

FIG. I is a condensed schematic block flow arrangement of a process directed to the conversion of coal to synthesis gas comprising carbon monoxide and hydrogen, the reduction of carbon monoxide by the Fischer-Tropsch Process to form a product mixture comprising hydrocarbon and oxygenates and the recovery of these products for further use.

FIG. II is a condensed schematic block flow arrangement and sequence of steps for improving the process of FIG. I by employing the concepts of this invention.

Referring now to FIG. I, there is shown in a specific embodiment a substantially reduced block flow arrangement of a hydrogen-carbon monoxide syngas conversion process. A coal gasifier section 2 is supplied with pulverized coal introduced by conduit 4. Steam is introduced by conduit 6 and oxygen by conduit 8. The products of gasifier section 2 are then passed by conduit 10 to a gas scrubber section 12. In scrubber section 12, carbon monoxide and hydrogen are separated from hydrogen sulfide removed by conduit 14, carbon dioxide is removed by conduit 16, tars and phenols are removed by conduit 18 and ammonia is removed by conduit 20. The carbon monoxide-hydrogen rich gas is passed from section 12 by conduit 22 to a partial combustion zone 24 supplied with steam by conduit 26 and oxygen by conduit 28. Recycle fuel gas comprising $C_2$ and lower boiling gaseous material of the combination process separated from carbon dioxide is recycled by conduit 30 to the partial combustion section 24. In the partial combustion operation of section 24, a carbon monoxide-hydrogen synthesis gas of desired ratio is formed for passage and use in a downstream Fischer-Tropsch synthesis gas conversion operation.

The synthesis gas prepared as above briefly identified is passed by conduit 32 to a Fischer-Tropsch reaction section 36 provided with for example an iron synthesis catalyst in admixture with $C_2$ recycle gas introduced by conduit 34. Generally, the synthesis gas feed is introduced at a temperature of about 160° C and at an elevated pressure of about 365 psig. The temperature of the synthesis gas admixed with catalyst in the fluid operation rapidly rises by the heat liberated so that the Fischer-Tropsch and water gas shift reactions are conveyed by conduit 38 to a primary cooling section 40 wherein the temperature of the mixture is reduced to within the range of 280° to about 400° F. In the primary cooling section, a separation is made which permits the recovery of a slurry oil and catalyst stream as by conduit 42, and a decant oil stream by conduit 44. In one typical operation, the decant oil stream will have an ASTM/95% boiling point of about 890° F. A light oil stream boiling below about 500° F and more usually below about 450° F including lower boiling components comprising oxygenates is passed by conduit 46 to a second or final cooling and separating section 48 maintained at a temperature of about 100° F and an elevated pressure of about 265 psig. In section 48, a separation is made to recover a water phase comprising water soluble chemicals comprising oxygenates withdrawn by conduit 50, a light hydrocarbon oil phase comprising $C_5$ to about 500° F boiling hydrocarbons withdrawn by conduit 52 and a vaporous phase comprising $C_2$ and lower boiling gaseous components withdrawn by conduit 54. A portion of the vaporous phase comprising unreacted carbon monoxide and hydrogen is recycled by conduit 34. In a typical operation about one volume of fresh feed is used with two volumes of the recycle gas. The lighter hydrocarbons do not completely condense and an absorber system is used for their recovery. Methane and LPG hydrocarbons are blended with other components for use in a pipe line system where desired. On the other hand, they may be passed to the gas reforming section for conversion and recycle as feed gas in the synthesis operation. The light oil hydrocarbon phase received in conduit 52 is then passed through a water wash section 56 to remove water soluble components to which wash water is added by conduit 58. In wash section 56, water soluble materials comprising oxygenates are removed and withdrawn therefrom by conduit 60. The water phases in conduits 50 and 60 are combined and passsed to a chemicals recovery operation 62. The washed hydrocarbon phase is removed by conduit 64 and passed to a clay treater 66 along with a hydrocarbon fraction boiling below about 600° F recovered from the decanted oil phase in conduit 44 and a heavy oil product fraction recovered as hereinafter described. The hydrocarbon phase thus recovered and passed to this clay treating section is preheated to an elevated temperature of about 600° F before contacting a silica/alumina catalyst or clay retained in the treater. This operation converts retained oxygenates and some alpha olefins in the product thereby imparting a higher octane rating to the olefins. The treatment also operates to substantially reduce harmful acids and other oxygenates retained in the hydrocarbon phase after the water wash. The clay treated hydrocarbon product is then passed by conduit 68 to a hydrocarbon separation reaction 70.

A portion of the hydrocarbon vapors in conduit 54 not directly recycled to the Fischer-Tropsch conversion operation by conduit 34 is also passed to the hydrocarbon separation section 70. In the hydrocarbon separation section 70, a separation is made to recover by conduit 72 a flue gas stream comprising $C_2^-$ hydrocarbons and other lower gaseous components suitable for reforming to CO and $H_2$. A portion of this material is passed through a $CO_2$ scrubber 74 before recycle by conduit 30 to the partial combustion zone 24. A portion of the fuel gas may be withdrawn for other use by conduit 76. In separation section 70, a $C_2$ olefin rich stream is recovered by conduit 78 for chemical processing as desired. A $C_3$ to $C_4$ hydrocarbon stream is withdrawn by conduit 80 and passed to catalytic polyermization in section 82. Polymerized material suitable for blending with gasoline product is withdrawn by conduit 84. A gasoline product fraction recovered by conduit 86 and a light fuel oil product such as No. 2 fuel oil is withdrawn by conduit 90 for admixture with the decant oil fraction in conduit 44 as mentioned above. The blend of hydrocarbon product thus formed will boil generally in the range of about 400° F to about 1000° F. This material blend is passed to a separator section 92 wherein a separation is made to recover a fraction boiling in the range of from about 400° to about 650° F withdrawn by conduit 94 from a heavier waxy oil withdrawn by conduit 96.

In this relatively complicated synthesis gas conversion operation and product recovery, it is not unusual to recover a product distribution comprising 2% ethylene, 8% LPG, 70% gasoline boiling material, 3% fuel oil, 3% waxy oil, and about 14% of material defined as oxygenates.

In accordance with the present invention, the product distribution obtained from a Fischer-Tropsch synthesis gas operation above defined is modified in part by the use of a special class of crystalline zeolites represented by ZSM5 zeolite, by the feed charged and the operating conditions employed.

The special zeolite catalysts referred to herein utilize members of a special class of zeolites exhibiting some unusual properties. These zeolites induce profound transformations of aliphatic hydrocarbons to aromatic hydrocarbons in commercially desirable yields and are generally highly effective in alkylation, isomerization, disproportionation and other reaction involving aromatic hydrocarbons. Although they have unusually low alumina contents, i.e., high silica to alumina ratios, they are very active with silica to alumina ratio exceeding 30. This activity is surprising since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g. of the X and A type. Furthermore, carbonaceous deposits when formed, may be removed by burning at higher than usual temperatures to restore activity. In many environments, the zeolites of this class exhibit very low coke forming capability, conducive to very long time on stream between burning regenerations.

An important characteristic of the crystal structure of this class of zeolites is that it provides constrained access to, and egress from, the intra-crystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolties useful as a catalyst in this invention possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The zeolites useful as catalysts in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Zeolites with windows of 10-membered rings are preferred, although excessive puckering or pore blockage may render these zeolites substantially ineffective. Zeolites with windows of twelve-membered rings do not produce the advantageous conversions desired in the instant invention, although structures can be conceived, due to pore blockage or other cause, that may be operative.

Rather than attempt to judge from crystal structure whether or not a zeolite possesses the necessary constrained access, a simple determination of the "constraint index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F for at least 15 minutes. The zeolite is then flushed with helium and the temperature adjusted between 550° F and 950° F to give an overall conversion between 10% and 60%. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} \text{(fraction of n-hexane remaining)}}{\log_{10} \text{(fraction of 3-methylpentane remaining)}}$$

The constraint index approximates the ratio of the cracking rate constants for the two hydrocarbons. Catalysts suitable for the present invention are those which employ a zeolite having a constraint index from 1.0 to 12.0. Constraint Index (CI) values for some typical zeolites including some not within the scope of this invention are:

| CAS | C.I |
|---|---|
| ZSM-5 | 8.3 |
| ZSM-11 | 8.7 |
| ZSM-35 | 4.5 |
| TMA Offretite | 3.7 |
| ZSM-12 | 2 |
| ZSM-38 | 2 |
| Beta | 0.6 |
| ZSM-4 | 0.5 |
| Acid Mordenite | 0.5 |
| REY | 0.4 |
| Amorphous Silica-alumina | 0.6 |
| Erionite | 38 |

The above-described Constraint Index is an important and even critical, definition of those zeolites which are useful to catalyze the instant process. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above defined range of 1 to 12.

Thus, it should be understood that the "Constraint Index" value as used herein is an inclusive rather than an exclusive value. That is, a zeolite when tested by any combination of conditions within the testing definition set forth herein above to have a constraint index of 1 to 12 is intended to be included in the instant catalyst definition regardless that the same identical zeolite tested under other defined conditions may give a constraint index value outside of 1 to 12.

The class of zeolites defined herein is exemplified by ZSM-5, ZSM-11, ZSM-12, ZSM-21, ZSM-35, ZSM-38 and other similar material. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

U.S. application Ser. No. 528,061, filed Nov. 29, 1974 U.S. Pat. No. 4,016,245, the entire contents of which are incorporated herein by reference, describes a zeolite composition including a method of making it. This composition is designated ZSM-35 and is useful in this invention.

U.S. application Ser. No. 528,060, filed Nov. 29, 1974 now abandoned, the entire contents of which are incorporated herein by reference, describes a zeolite composition including a method of making it. This composition is designated ZSM-38 and is useful in this invention.

The x-ray diffraction pattern of ZSM-21 appears to be generic to that of ZSM-35 and ZSM-38. Either or all of these zeolites is considered to be within the scope of this invention.

The specific zeolites described, when prepared in the presence of organic cations, are substantially catalytically inactive, possibly because the intracrystalline free space is occupied by organic cations from the forming solution. They may be activated by heating in an inert atmosphere at 1000° F for one hour, for example, followed by base exchange with ammonium salts followed by calcination at 1000° F in air. The presence of organic cations in the forming solution may not be absolutely essential to the formation of this special type zeolite; however, the presence of these cations does appear to favor the formation of this special type of zeolite. More generally, it is desirable to activate this type zeolite by base exchange with ammonium salts followed by calcination in air at about 1000° F for from about 15 minutes to about 24 hours.

Natural zeolites may sometimes be converted to this type zeolite by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12 and ZSM-21, with ZSM-5 particularly preferred.

The zeolites used as catalysts in this invention may be in the hydrogen form or they may be base exchanged or impregnated to contain ammonium or a metal cation complement. It is desirable to calcine the zeolite after base exchange. The metal cations that may be present include any of the cations of the metals of Groups I through VIII of the periodic table. However, in the case of Group IA metals, the cation content should in no case be so large as to substantially eliminate the activity of the zeolite for the catalysis being employed in the instant invention. For example, a completely sodium exchanged H-ZSM-5 appears to be largely inactive for shape selective conversions required in the present invention.

In a preferred aspect of this invention, the zeolites useful as catalysts herein are selected as those having a crystal framework density, in the dry hydrogen form, of not substantially below about 1.6 grams per cubic centimeter. It has been found that zeolites which satisfy all three of these criteria are most desired. Therefore, the preferred catalysts of this invention are those comprising zeolites having a constraint index as defined above of about 1 to 12, a silica to alumina ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April, 1967" published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, seems to be important as the locus of catalytic activity.

Crystal framework densities of some typical zeolites including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

FIG. II is a diagrammatic sketch in elevation of a block flow arrangement for improving the product destribution obtained by the process of FIG. I.

In the arrangement of FIG. II, the product effluent of the F-T synthesis gas conversion operation defined with respect to FIG. I and recovered by conduit 38 is passed to a first cooling separation zone 100 maintained at a temperature within the range of 280° to 400° F. wherein a separation is made to recover a slurry oil containing catalyst recovered by conduit 102, a decant oil boiling in the range of from about 400° F. to about 1000° F. removed by conduit 104 and a lower boiling light oil fraction comprising normally gaseous components of the synthesis gas conversion operation removed as a combined fraction by conduit 106. The light oil fraction boiling below 500° F and comprising lower boiling gaseous components is passed through a furnace 108 wherein the temperature thereof is raised to a temperature within the range of 600° to 900° F. The thus heated light oil containing material is passed in contact with a ZSM-5 crystalline zeolite in reaction zone 112 maintained at a temperature within the range of 600° F. to about 900° F. and a pressure within the range of 300 to 700 psig. The product of light oil conversion in zone 112 is passed by conduit 114 to a final cooling and separation operation 116 maintained at a temperature of about 100° F and a pressure of about 260 psig. The effluent is separated to recovered a water phase withdrawn by conduit 118, a vapor phase comprising $C_4$ and lower boiling components withdrawn by conduit 120 and a hydrocarbon phase comprising $C_4$ and higher boiling hydrocarbons boiling up to about 400° F withdrawn by conduit 122 which is passed to a hydrocarbon separation section 130 discussed below. Vaporous material withdrawn by conduit 120 may be recycled all or in part by conduit 34 to the Fischer-Tropsch synthesis operation as discussed with respect to FIG. I. On the other hand, a portion of this vaporous material may be passed by conduit 124 to the hydrocarbon separation section 130. In the separation section represented by 130, a separation is made of the products obtained from the conversion zones 112 and 126 to obtain a fuel oil product of about 750° F end point recovered by conduit 132, a heavy higher boiling fraction withdrawn by conduit 134; a gasoline fraction withdrawn by conduit 136 and a fraction comprising $C_4$ and lower boiling components withdrawn by conduit 138 and suitable for use as feed in a polymerization zone or an alkylation zone represented by 140. More usually, zone 140 will be an alkylation zone since processing with the special zeolite catalyst herein identified produces considerable isobutane and olefins suitable as feed to such an alkylation operation. The alkylate product thus produced is then passed by conduit 142 to conduit 136 containing gasoline product withdrawn from separation section 130. Fuel gas products comprising $C_2$ minus products are withdrawn by conduit 144 and processed in the same manner as discussed with respect to products in conduit 72 of FIG. I.

DISCUSSION OF SPECIFIC EMBODIMENTS

In accordance with this invention, an oil fraction boiling generally in the range of 400° to 1000° F and specifically identified in Table 1 below is passed in contact with a crystalline zeolite of the class represented by ZSM-5 crystalline zeolites at temperature of about 600° F. and a hydrogen pressure of about 400 psig.

TABLE 1

| PROPERTIES | Decant Oil |
|---|---|
| Gravity, ° API | 32.4 |
| Pour Point, ° F. | 95 |
| Bromine No. | 30.3 |
| ASTM Color | D8.0 |
| Hydrogen, Wt. % | 12.68 |
| Sulfur, Wt. % | 0.003 |
| Nitrogen, Wt. % | 0.0015 |
| Oxygen, Wt. % | 1.61 |
| Molecular Wt. | 292 |
| Composition*, Wt. % | |
| Paraffins | 18.7 |
| Naphthenes | 28.3 |
| Aromatics | 53.0 |
| Distillation (D-1160), ° F. | |
| IPB | 356 |
| 5, vol % | 459 |
| 10 vol % | 493 |
| 30 vol % | 580 |
| 50 vol % | 666 |
| 70 vol % | 767 |
| 90 vol % | 912 |
| 95 vol % | 976 |

*Composition by silica gel/mass spectrometry.

The reaction product of the crystalline zeolite conversion operation in reactor 126 is identified in Table 2 below.

TABLE 2

| | Process Runs on Decant Oil | |
|---|---|---|
| Run No. 134- | 1162 | 1166 |
| Catalyst(s) | ZSM-5 | CoMo/AL$_2$O$_3$/ZSM-5 |
| Process Conditions: | | |
| Avg. Reactor Temp., ° F. | 650 | 650 |
| H$_2$ Pressure, psig | 400 | 400 |
| LHSV, V/Hr/V | | |
| CoMg/Ah$_2$O$_3$ | +0 | 1.5 |
| ZSM-5 | 1.5 | 1.5 |
| Yields on Charge | | |
| C$_1$-C$_2$, Wt. % | 0.4 | 0.3 |
| C$_3$ Wt. % | 1.9 | 3.8 |
| C$_4$ Vol. % | 6.8 | 9.0 |

TABLE 2-continued

| | Process Runs on Decant Oil | |
|---|---|---|
| C$_5$+ Naphtha, Vol. % | 19.9 | 43.2 |
| Gas Oil | 75.2 | 51.2 |
| Properties | | |
| C$_5$ + Naphtha | 50.4 | 50.9 |
| | 88.3 | 97.9 |
| Gravity, ° API | | |
| Octane No. (R+3) | | |
| Gas Oil | Charge | |
| Gravity, ° API | 32.4 | 29.9 | 25.5 |
| Pour Point, ° F. | 95 | 55 | <−65 |
| ASTM Dist., ° F. | | | |
| 5 Vol % | 459 | 460 | 400 |
| 95 Vol % | 976 | 978 | 669 |

It will be observed when comparing the information Tables 1 and 2 that processing of such an oil fraction of relatively high pour point such as one derived from a Fischer-Tropsch synthesis gas operation, that the crystalline zeolite operation was able to convert up to 50 volume percent of the material to gasoline and lighter material and significantly lower the pour point of the oil charged. On the other hand, when the waxy oil feed is first passed in contact with a cobalt molybdenum on alumina hydrogenation catalyst under relatively mild conditions, the conversion of the hydrogenated feed by the ZSM-5 zeolite is significantly improved and the end point of the oil charge is lowered far beyond that expected. A unique feature of the method of this invention is the high yield of converted material. By way of comparison, for petroleum derived gas oils, the conversion is always less than the total paraffin content of the gas oil since substantially only normal and singly branched paraffins in such a feed enter the channels of the ZSM-5 crystalline zeolite. On the other hand, a decant oil liquid derived from a Fischer-Tropsch synthesis operation normally contains less than about 19 weight percent paraffins as determined by standard silica gel separation - mass spectrometary and therefore one would expect conversion thereof to be less than 19 weight percent. However, a conversion greater than 48 weight percent was obtained.

A further unique feature of the present invention is the finding that there is an unexpected improved conversion coupled with a lowering of the end point of the unconverted oil and the pour point lowering is far beyond the wildest expectations. By first passing the raw oil fraction above defined over a mild hydrogenation catalysts and then contacting the product thereof with the ZSM-5 crystalline zeolites, the unexpected improvement above identified was obtained.

This was most unexpected since comparable experiments with petroleum derived gas oils do not show this kind of activity and selectivity when passed in contact with ZSM-5 zeolite catalyst.

In run 1 of Table 2, a suitable oil fraction was passed in contact with a ZSM-5-crystalline zeolite catalyst alone at 1.5 LHSV, 650° F. and 400 psig hydrogen pressure. In run 2, the same oil fraction was passed in contact with a fixed bed of catalyst consisting of one half cobalt molybdenum on alumina hydroprocessing catalyst in the first part of the catalyst bed with the remaining half comprising ZSM-5 zeolite catalyst. The processing conditions were the same for the catalyst systems as shown in Table 2. The combined catalyst system gave higher conversions and a naphtha product of improved octane-rating. A most significant and unexpected result is the lowering of the pour point of this gas oil fraction to <−65° F.

In the method of this invention, it is contemplated processing a decant oil fraction of Fischer-Tropsch synthesis at a pressure within the range of 25 to 1500 psig; preferably from 300 to 800 psig; a temperature within the range of 500° to 850° F; preferably from 550° to 770° F; a space velocity within the range of 0.2 to 3.0 LHSV; preferably 0.55 to 2.0 LHSV and a hydrogen circulation in the range of 500 to 4000 SCF/B but preferably from 1000 to 3000 SCF/B.

The method of this invention upgrades the entire heavy oil fraction boiling in the range of 400° to 1000° F. to form both a high octane gasoline product and a low pour point distillate fraction in relatively high yields. The method of this invention is applicable to petroleum fractions and synthetic crude materials similar in composition to that obtained as by the Fischer-Tropsch Synthesis process. This would include unsaturated olefinic stocks such as coker gas oils, TCC and FCC distillates and high pour shale oil distillates.

In conjunction with the above, it has been recognized that a further improvement can be realized in the decant oil hydrodewaxing operation or in hydrodewaxing a heavy gas oil stream with a ZSM5 class of crystalline zeolite with respect to the catalyst aging rate if one preconditions the catalyst with a hydrogen-steam mixture. Also, it has been observed that the addition of a small amount of water during the hydrodewaxing operation gives a further additional improvement in the catalyst aging rate. The operating conditions are 1.5 LHSV, 400 psig hydrogen pressure and 2500 SCF/B $H_2$ circulation. The catalyst employed was a nickel promoted ZSM5 crystalline zeolite that was preconditioned prior to start up by the following sequence:

1. Heat catalyst up in hydrogen at a rate of 100° F/hr at 500 psig.
2. Hydrogen reduce catalyst at 800° F for 2 hours at 500 psig.
3. Sulfide catalyst with 2% $H_2S$-98% $H_2$ at 400 psig as follows:
   a. 1 hour at 500° F
   b. 1 hour at 650° F
   c. 2 hours at 750° F
4. Treat catalyst with 50% steam-50% hydrogen mixture at 50 psig and 800° F for 24 hours.
5. Reduce catalyst temperature and charge oil at 525° F.

Start up procedure for the catalyst prior to the present invention is the same as above provided except for step (4) wherein the catalyst is heated with a 50/50 steam/hydrogen mixture.

The catalyst aging without steam preconditioning gave a catalyst aging rate of 9° F/day. A substantial reduction in aging rate is obtained with the steam treated catalyst, comprising step 4, giving a 2.5° F/day aging rate after a 6 day line out.

To determine the effect of water addition on catalyst aging during the hydrodewaxing operation, 1.5 wt. % water based on charge was added continuously after 24 days on stream processing the heavy gas oil feed. This water treatment reduced the aging rate to 1.9° F/day, a 24% improvement in aging over the initial steam treatment.

The hydrodewaxing operation above discussed with the crystalline zeolite conversion catalyst may be accomplished in the presence of a hydrogenation component such as shown by the example or it may be accomplished in the absence of added hydrogenation component. Substantially any hydrogenation component may be employed, it being preferred to use a Group VIII metal hydrogenation component with the crystalline zeolite conversion catalyst in relatively small amounts.

Having, thus, generally described the invention and discussed specific examples in support thereof, it is to be undestood that no undue restrictions are to be imposed by the reasons thereof except as defined by the following claims.

We claim:

1. In a process for hydrodewaxing a Fischer-Tropsch decant oil fraction boiling in the range of 400° F to about 1000° F wherein the heavy oil fraction is contacted in the presence of hydrogen with a crystalline zeolite catalyst having a pore diameter greater than about 5 Angstroms; a silica-to-alumina ratio of at least 12; a constraint index within the range of 1 to 12; the method for improving the catalyst selectivity and aging rate during said operation which comprises preconditioning said catalyst by,
   a. heating the catalyst gradually with hydrogen at 800° F for two hours at a pressure of about 500 psig,
   b. sulfiding the hydrogen treated catalyst at a temperature within the range of 500° to 750° F.,
   c. contacting the sulfided catalyst with a steam-hydrogen mixture at 800° F for 24 hours, and
   d. reducing the temperature of the steam treated catalyst to about 500° F before initially contacting the oil charge therewith under hydrodewaxing conditions.

2. The method of claim 1 wherein said steam is added with the heavy oil fraction brought in contact with said crystalline zeolite catalyst.

3. The method of claim 1 wherein the crystalline zeolite is characterized as having a pore opening of at least 5 Angstroms, a silica-alumina ratio of at least 12 and a constraint index within the range of 1 to 12.

4. The method of claim 1 wherein the crystalline zeolite catalyst comprises a hydrogenating component.

5. The process of claim 1 wherein the hydrodewaxing operation is accomplished over a temperature span in the range of 500° to 800° F and the pressure is maintained within the range of 25 to 1500 psig.

UNITED STATES PATENT AND TRADEMARK OFFICE
CERTIFICATE OF CORRECTION

PATENT NO. : 4,053,532
DATED : October 11, 1977
INVENTOR(S) : HENRY R. IRELAND and THOMAS R. STEIN It is certified that error appears in the above–identified patent and that said Letters Patent are hereby corrected as shown below:

| | |
|---|---|
| Column 1, line 35 | "monoxides" should be --monoxide--. |
| Column 4, line 23 | After "as" add --a--. |
| Column 9, line 61 (Table 2) | Under Run 1166, "CoMo/AL$_2$O$_3$/ZSM-5" should be --CoMo/Al$_2$O$_3$/ZSM-5--. |
| Column 9, line 64 " " | "CoMg/Ah$_2$O$_3$" should be --CoMo/Al$_2$O$_3$--. |
| Column 9, line 64 " " | Under Run 1162 "+O" should be --O--. |
| Column 10, line 15 | After "information" add --of--. |
| Column 10, line 54 | After "with" add --a--. |
| Column 12, line 43 | After "wherein" delete --said--. |

Signed and Sealed this

Twenty-eighth Day of February 1978

[SEAL]

Attest:

RUTH C. MASON
Attesting Officer

LUTRELLE F. PARKER
Acting Commissioner of Patents and Trademark